US 9,883,050 B1

(12) United States Patent
Ding et al.

(10) Patent No.: US 9,883,050 B1
(45) Date of Patent: Jan. 30, 2018

(54) FLEXIBLE ONLINE CHARGING SYSTEM

(71) Applicant: ALCATEL-LUCENT CANADA INC., Ottawa (CA)

(72) Inventors: Zhaoliang Z. Ding, Ottawa (CA); Haiqing H. Ma, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/365,288

(22) Filed: Nov. 30, 2016

(51) Int. Cl.
*H04M 15/00* (2006.01)
*H04L 12/24* (2006.01)
*H04L 12/14* (2006.01)
*H04W 4/26* (2009.01)
*H04W 4/24* (2009.01)

(52) U.S. Cl.
CPC ........ *H04M 15/64* (2013.01); *H04L 12/1407* (2013.01); *H04L 41/22* (2013.01); *H04M 15/66* (2013.01); *H04W 4/24* (2013.01); *H04W 4/26* (2013.01)

(58) Field of Classification Search
CPC ... H04W 4/24; H04W 88/16; H04W 28/0268; H04W 4/26; H04W 76/02; H04L 12/1407; H04L 12/14; H04L 41/0893; H04L 12/1403; H04L 67/306; H04L 41/50; H04L 41/22; H04L 41/5051; H04M 15/66; H04M 15/64; H04M 15/41
See application file for complete search history.

(56) References Cited

U.S. PATENT DOCUMENTS

2006/0291486 A1* 12/2006 Cai .................. H04L 12/14
370/401
2016/0330329 A1* 11/2016 Xia .................. H04M 15/43

OTHER PUBLICATIONS

3rd Generation Partnership Project; Policy and Charging Control Signalling Flows and Quality of Service (QOS) Parameter Mapping; Release 11; 3GPP TS 29.213; V11.4.0; Sep. 2012.
3rd Generation Partnership Project; Policy and Charging Control(PCC); Reference Points; Release 11; 3GPP TS 29.212; V11.6.0; Sep. 2012.
3rd Generation Partnership Project; Policy and Charging Control: Spending Limit Reporting over Sy Referenced Point; Release 11; 3GPP TS 29.219; V11.2.0; Sep. 2012.

* cited by examiner

*Primary Examiner* — Olumide T Ajibade Akonai
(74) *Attorney, Agent, or Firm* — Kramer & Amado, P.C.

(57) ABSTRACT

Various exemplary embodiments relate to a method performed by a policy and charging rules function (PCRF) node for selecting an Online Charging System (OCS), the method including: receiving a session establishment request for a subscriber (subscriber session); selecting an OCS realm for the subscriber session based on, in order of priority: policy rules, subscriber attribute or system preference; selecting an OCS host for the subscriber session based on, in order of priority: policy rules, subscriber attribute or system preference; and creating an Sy session using the selected OCS realm and selected OCS host.

20 Claims, 6 Drawing Sheets

FLEXIBLE ONLINE CHARGING SYSTEM

FIELD OF INVENTION

The invention is directed to telecommunications networks and more specifically, to improved online charging system in Evolved Packet Core (EPC) telecommunications networks.

BACKGROUND

The Sy reference point is described in 3GPP TS 29.219 version 11.2.0 Release 11.

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.219, describe the Policy and Charging Rules Function (PCRF), Policy and Charging Enforcement Function (PCEF), and the Sy reference point. These specifications further provide some guidance as to how these elements interact in order to provide reliable data services and charge subscribers for use thereof.

The PCRF uses the policy counter statuses relating to subscriber spending, received from the OCS via the Sy reference point as input to its policy decisions, e.g., downgrade the Quality of Service (QoS) (e.g. APN-AMBR) or modify the PCC/QoS/ADC Rules. In this context therefore, improved flexibility of online charging system is highly desirable.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules function (PCRF) node for selecting an Online Charging System (OCS). The method comprises: receiving at the PCRF node, a session establishment request for a subscriber (subscriber session); selecting an OCS realm for the subscriber session based on, in order of priority: policy rules; subscriber attribute; or system preference; and selecting an OCS host for the subscriber session based on, in order of priority: policy rules; subscriber attribute; or system preference; and creating an Sy session using the selected OCS realm and selected OCS host.

In various alternative embodiments, creating the Sy session comprises sending a Sy message wherein the Destination-Realm field of the Sy message comprises the selected OCS realm and the Destination-Host field of the Sy message comprises the selected OCS host.

In various alternative embodiments, the selected OCS host is not defined and the Destination-Host field of the Sy message is null.

In various alternative embodiments, the Sy message comprises a Spending-Limit-Request (SLR) command.

In various alternative embodiments, selecting an OCS realm for the subscriber session comprises: determining if the OCS realm is configured by policy rules and if so selecting the OCS realm configured by the policy rules; if the OCS realm is not configured by policy rules then determining if the OCS realm is configured by a subscriber attribute and if so selecting the OCS realm configured by the subscriber attribute; and if the OCS realm is not configured by a subscriber attribute then selecting the OCS realm configured by a system preference.

In various alternative embodiments, selecting an OCS host for the subscriber session comprises: determining if the OCS host is configured by policy rules and if so selecting the OCS host configured by the policy rules; if the OCS host is not configured by policy rules then determining if the OCS host is configured by a subscriber attribute and if so selecting the OCS host configured by the subscriber attribute; if the OCS host is not configured by a subscriber attribute then determining if the OCS host is configured by a system preference and if so selecting the OCS host configured by the system preference; and if the OCS host is not configured by a system preference then selecting the OCS host as null.

In various alternative embodiments, the policy rules, subscriber attribute and system preference are configured via a user interface.

In various alternative embodiments, the policy rules, subscriber attribute and system preference are configured via an application program interface (API).

Other embodiments of the invention provide a tangible and non-transitory machine-readable storage medium encoded with instructions thereon for execution by a policy and charging rules function (PCRF) node, wherein the tangible and non-transitory machine-readable storage medium comprises instructions for: receiving at the PCRF node, a session establishment request for a subscriber (subscriber session); selecting an OCS realm for the subscriber session based on, in order of priority: policy rules; subscriber attribute; or system preference; and selecting an OCS host for the subscriber session based on, in order of priority: policy rules; subscriber attribute; or system preference; and creating an Sy session using the selected OCS realm and selected OCS host.

Other embodiments of the invention provide a Policy and Charging Rules Function (PCRF) node for a 3GPP-compliant packet data network, the PCRF node configured to:

receive at the PCRF node, a session establishment request for a subscriber (subscriber session); select an OCS realm for the subscriber session based on, in order of priority: policy rules; subscriber attribute; or system preference; and select an OCS host for the subscriber session based on, in order of priority: policy rules; subscriber attribute; or system preference; and create an Sy session using the selected OCS realm and selected OCS host.

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1:
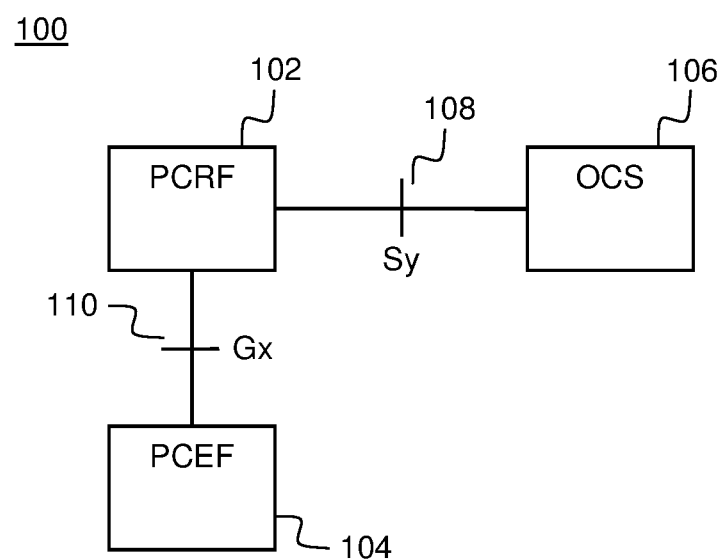
FIG. 1 illustrates a prior art network with a single OCS.

Referring now to the drawings, in which like numerals refer to like components or steps, there are disclosed broad aspects of various exemplary embodiments.

FIG. 1 illustrates a simplified block diagram of a prior art network 100 with a single online charging system (OCS). Typically, Policy and Charging Rules Function (PCRF) node 102 receives a request for service for a subscriber from Policy and Charging Enforcement Function (PCEF) 104 via Gx reference point. PCRF node 102 initiates a Sy session by sending a Spending-Limit-Request (SLR) message via Sy reference point 108 to online charging system (OCS) 106.

However, with increasing complexity of communications networks and of customer relationships and billing options, there is a need for being able to accommodate multiple OCSs and for providing a flexible way to associate specific OCSs with specific subscribers or according to specific policy rules.

Figure 2:
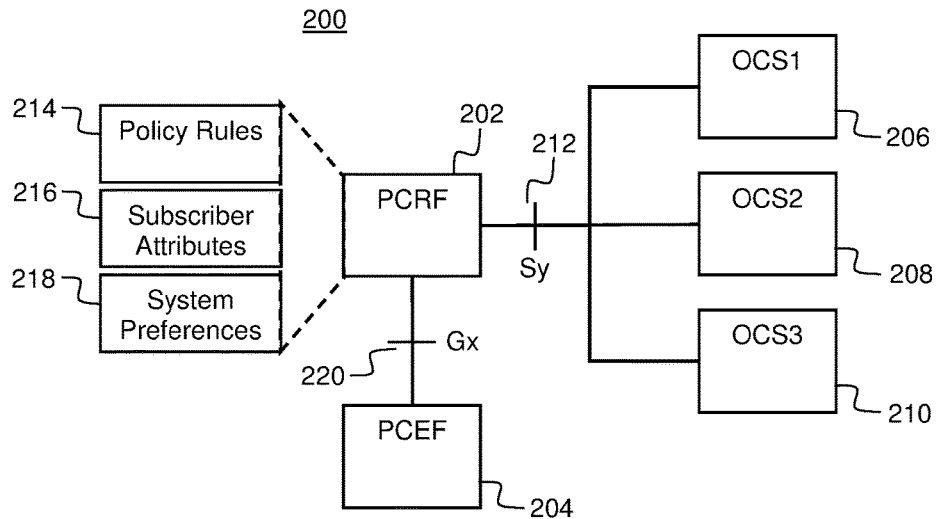
FIG. 2 illustrates an exemplary network with multiple OCSs according to an embodiment.

FIG. 2 illustrates a simplified exemplary network 200 with multiple OCSs: OCS1 206, OCS2 208, OCS3 210. PCRF 202 stores various parameters such as policy rules 214 which can be associated with specific conditions, subscriber attributes 216 which can be associated with specific subscribers and system preferences 218 which can be default values associated with the network 200. Policy rules 214 can define policy rule actions such as Sy-OCS-Realm and Sy-OCS-Host. Subscriber attributes 216 can define Sy OCS Realm and Sy OCS Host. These parameters 214, 216, 218 can be configured using a user interface such as for example, a graphical user interface (GUI) or using an application programming interface (API) for automated or bulk configuration. Thus OCS realm can be configured by any or all of: policy rules, subscriber attributes and/or by system preference, the final selection being made based on a relative priority of these three configurations as will be described with reference to FIG. 5. Similarly OCS host can be configured by any or all of: policy rules, subscriber attributes and/or by system preference, the final selection being made based on a relative priority of these three configurations as will be described with reference to FIG. 6. Once OCS realm and OCS host are selected, PCRF 202 can initiate a Sy session by creating and sending a SLR message with as will be described with reference to FIG. 4.

Figure 3:
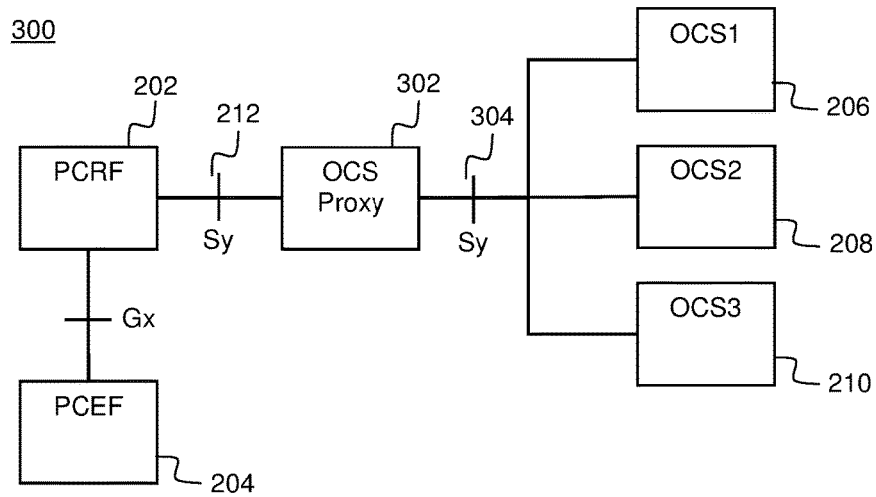
FIG. 3 illustrates an exemplary network with multiple OCSs according to another embodiment.

FIG. 3 illustrates a simplified exemplary network 300 with multiple OCSs: OCS1 206, OCS2 208, OCS3 210. Network 300 also provides an OCS Proxy 302 as an intermediary between PCRF 202 and the OCSs 206, 208, 210. When PCRF 202 initiates a Sy session, it sends a Sy message such as SLR message on the Sy reference point 212 addressed to the selected OCS similarly to the how the PCRF 202 behaves in network 200. OCS proxy 306 receives the SLR message and then forwards the SLR message over Sy reference point 304 to the appropriate OCS 206, 208 or 210.

Figure 4:
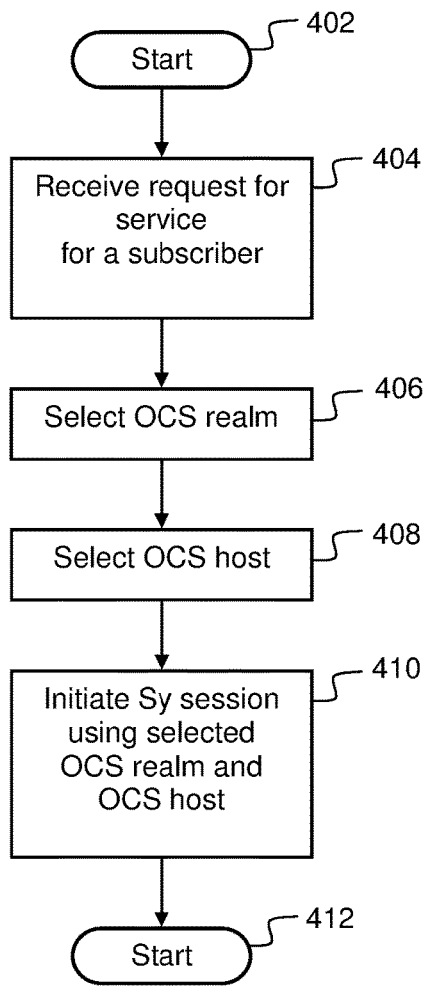
FIG. 4 illustrates a process flow diagram for selecting an OCS according to an embodiment.

FIG. 4 is a process flow diagram illustrating a method 400 for selecting an OCS using the contemplated multiple OCS system. The process starts at step 402. At step 404, PCRF 202 receives a request for service for a subscriber from PCEF 204 via Gx reference point 220. At step 406 PCRF 202 selects an OCS realm according to method 500 as will be described with reference to FIG. 5. At step 408 PCRF 202 selects an OCS host according to method 600 as will be described with reference to FIG. 6. Note that because OCS host definition is optional, method 500 can return a null value for OCS host.

At step 410, PCRF 202 initiates a Sy session by assembling and sending a Spending-Limit-Request (SLR) message via Sy reference point 212. Within the SLR message, Attribute-Value Pairs (AVPs): {Origin-Host} and {Origin-Realm} contain the host address and realm address of the PCRF 202 respectively and AVPs {Destination-Host} and {Destination-Realm} contain the host address and realm address of the selected OCS. If OCS host is not defined, then AVP {Destination-Host} will be null, in which case the system will forward the SLR message to the OCS associated with the selected realm. The method ends at step 412.

Figure 5:
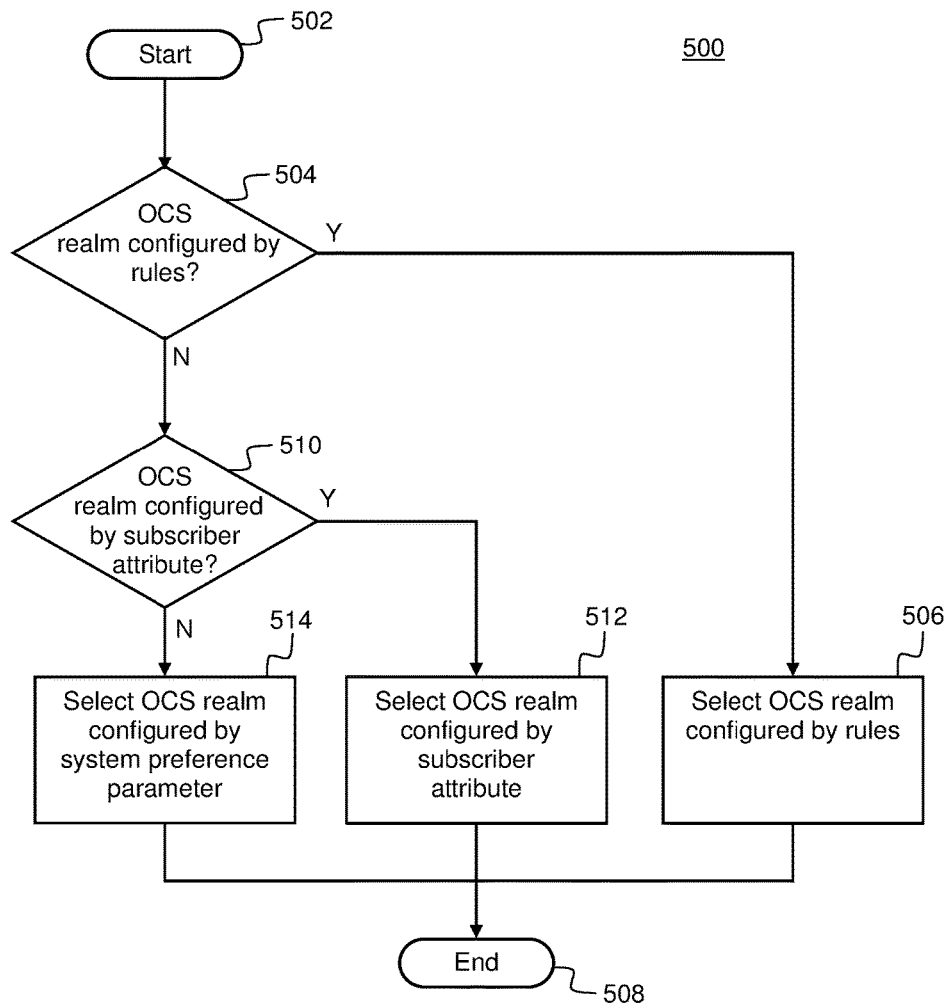
FIG. 5 illustrates a process flow diagram for selecting an OCS realm according to another embodiment.

FIG. 5 is a process flow diagram illustrating a method 500 for selecting an OCS realm using the contemplated multiple OCS system. The process starts at step 502. At step 504, PCRF 202 determines if OCS realm has been configured by PCRF policy rules and if so, the process continues to step 506 where PCRF 202 selects the OCS realm configured by the policy rules and the process ends at step 508.

If at step 504 PCRF 202 determines that OCS realm has not been configured by PCRF policy rules then the process continues to step 510 where PCRF 202 determines if OCS realm has been configured by a subscriber attribute associated with the subscriber for which the request for service was received at step 404, and if so the process continues to step 512 where PCRF 202 selects the OCS realm configured by the subscriber attribute and the process ends at step 508.

If at step 510 PCRF 202 determines that OCS realm has not been configured by a subscriber attribute then the process continues to step 514 where PCRF 202 selects the default OCS realm configured by the system preference parameter for network 200 and the process ends at step 508.

In this manner, the method establishes a hierarchy for defining OCS realm to accommodate multiple OCS nodes within a network and improve flexibility for network operators to allow multiple ways to define a specific OCS for specific subscribers, different groupings or classes of subscribers, or for all subscribers.

Figure 6:
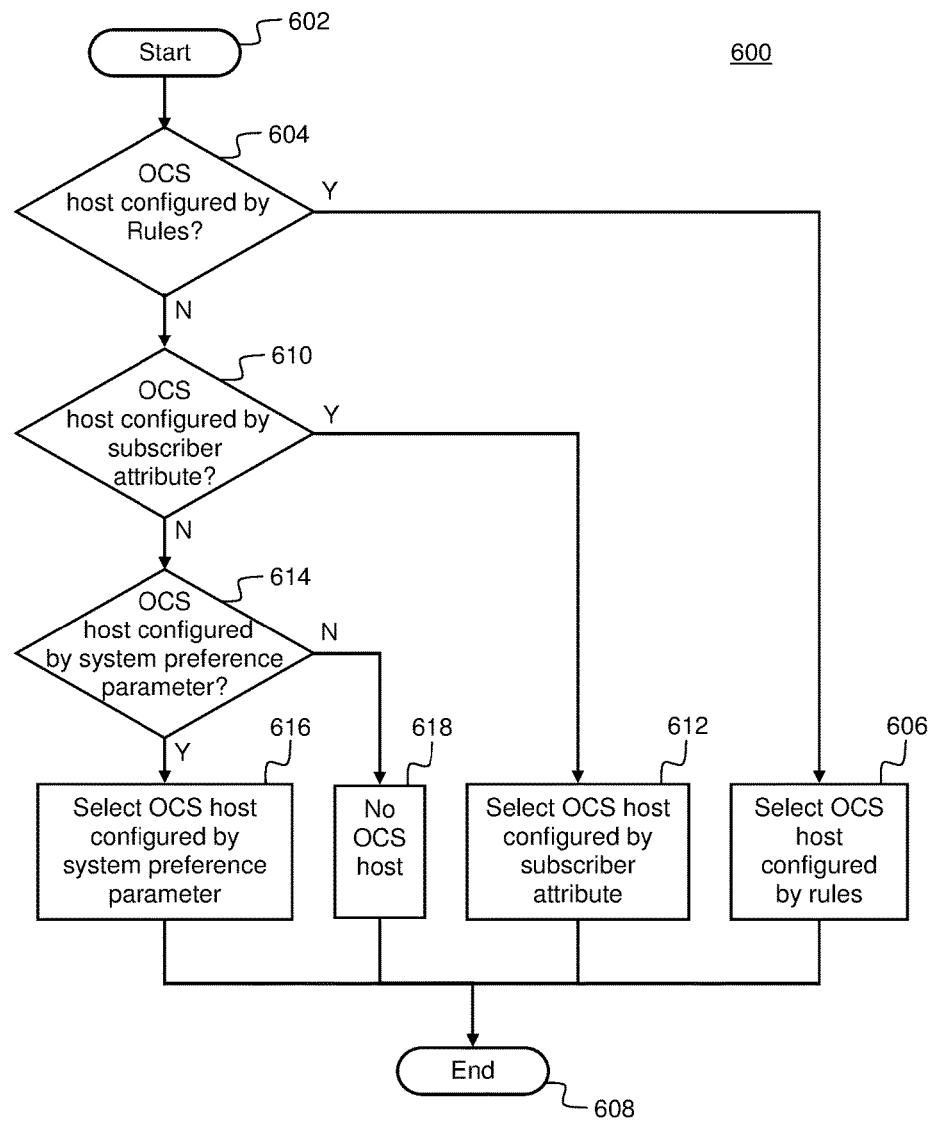
FIG. 6 illustrates a process flow diagram for selecting an OCS host according to another embodiment.

FIG. 6 illustrates a process flow diagram for selecting an OCS host using the contemplated multiple OCS system. The process starts at step 602. At step 604, PCRF 202 determines if OCS host has been configured by PCRF policy rules and if so, the process continues to step 606 where PCRF 202 selects the OCS host configured by the policy rules and the process ends at step 608.

If at step 604 PCRF 202 determines that OCS host has not been configured by PCRF policy rules then the process continues to step 610 where PCRF 202 determines if OCS host has been configured by a subscriber attribute associated with the subscriber for which the request for service was received at step 404, and if so the process continues to step 612 where PCRF 202 selects the OCS host configured by the subscriber attribute and the process ends at step 608.

If at step 610 PCRF 202 determines that OCS host has not been configured by a subscriber attribute then the process continues to step 614 where PCRF 202 determines if OCS host has been configured by a system preference parameter, and if so the process continues to step 616 where PCRF 202 selects the OCS host configured by the system preference parameter and the process ends at step 608.

If at step 614 PCRF 202 determines that OCS host has not been configured by a system preference parameter then no OCS host has been defined and at step 618 PCRF 202 selects a null value as the OCS host and the process ends at step 608.

In this manner, the method establishes a hierarchy for defining OCS host to accommodate multiple OCS nodes within a network and improve flexibility for network operators to allow multiple ways to define a specific OCS for specific subscribers, different groupings or classes of subscribers, or for all subscribers, or not to define a specific OCS host and let the network determine the OCS based on the selected OCS realm.

Figure 7:
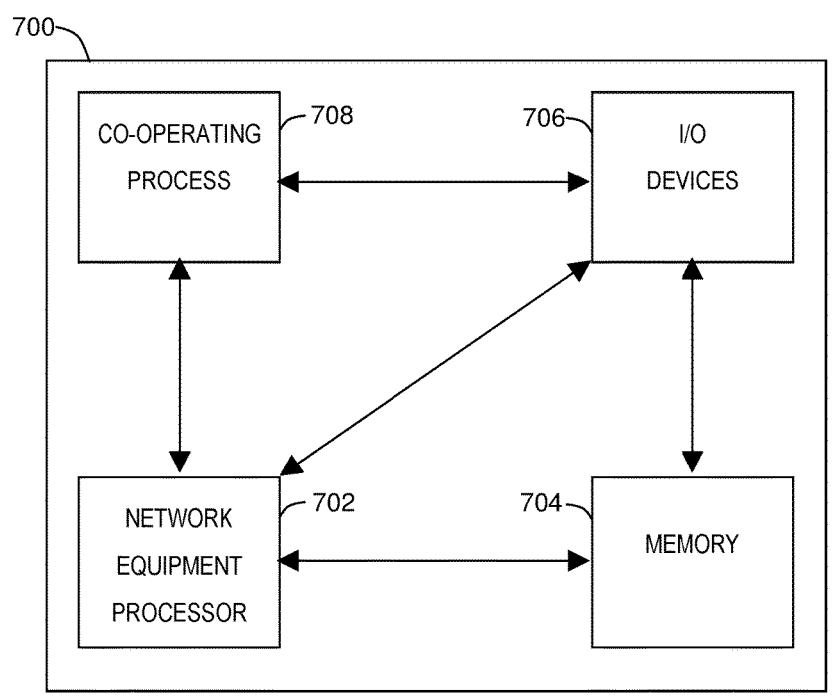
FIG. 7 illustrates a high-level block diagram of a network equipment processor assembly.

FIG. 7 depicts a high-level block diagram of a network equipment processor assembly suitable for use in performing functions described herein.

As depicted in FIG. 7, network equipment processor assembly 700 includes a network equipment processor element 702 (e.g., a central processing unit (CPU) and/or other suitable processor(s)), a memory 704 (e.g., random access memory (RAM), read only memory (ROM), and the like), a cooperating module/process 708, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 708 can be loaded into memory 804 and executed by network equipment processor 702 to implement the functions as discussed herein. As well, cooperating process 708 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method performed by a policy and charging rules function (PCRF) node for selecting an Online Charging System (OCS), the method comprising:
   receiving at said PCRF node, a session establishment request for a subscriber;
   selecting an OCS realm for said subscriber session based on, in order of priority: policy rules; subscriber attribute; or system preference;
   selecting an OCS host for said subscriber session based on, in order of priority: policy rules; subscriber attribute; or system preference; and
   creating an Sy session using the selected OCS realm and selected OCS host.

2. The method of claim 1, wherein creating said Sy session comprises sending a Sy message wherein the Destination-Realm field of said Sy message comprises said selected OCS realm and the Destination-Host field of said Sy message comprises said selected OCS host.

3. The method of claim 2, wherein said selected OCS host is not defined and said Destination-Host field of said Sy message is null.

4. The method of claim 2, wherein said Sy message comprises a Spending-Limit-Request (SLR) command.

5. The method of claim 1, wherein said selecting an OCS realm for said subscriber session comprises:
   determining if said OCS realm is configured by policy rules and if so selecting said OCS realm configured by said policy rules;
   if said OCS realm is not configured by policy rules then determining if said OCS realm is configured by a subscriber attribute and if so selecting said OCS realm configured by said subscriber attribute; and
   if said OCS realm is not configured by a subscriber attribute then selecting the OCS realm configured by a system preference.

6. The method of claim 1, wherein said selecting an OCS host for said subscriber session comprises:
   determining if said OCS host is configured by policy rules and if so selecting said OCS host configured by said policy rules;
   if said OCS host is not configured by policy rules then determining if said OCS host is configured by a subscriber attribute and if so selecting said OCS host configured by said subscriber attribute;
   if said OCS host is not configured by a subscriber attribute then determining if said OCS host is configured by a system preference and if so selecting said OCS host configured by said system preference; and
   if said OCS host is not configured by a system preference then selecting the OCS host as null.

7. The method of claim 1, wherein said policy rules, subscriber attribute and system preference are configured via a user interface.

8. The method of claim 1, wherein said policy rules, subscriber attribute and system preference are configured via an application program interface (API).

9. A tangible and non-transitory machine-readable storage medium encoded with instructions thereon for execution by a policy and charging rules function (PCRF) node, wherein the tangible and non-transitory machine-readable storage medium comprises instructions for:
   receiving at said PCRF node, a session establishment request for a subscriber (subscriber session);
   selecting an OCS realm for said subscriber session based on, in order of priority, policy rules, subscriber attribute or system preference;
   selecting an OCS host for said subscriber session based on, in order of priority, policy rules, subscriber attribute or system preference; and
   creating an Sy session using the selected OCS realm and selected OCS host.

10. The tangible and non-transitory machine-readable storage medium of claim 9, wherein the instructions for creating said Sy session further comprise instructions for sending a Sy message wherein the Destination-Realm field of said Sy message comprises said selected OCS realm and the Destination-Host field of said Sy message comprises said selected OCS host.

11. The tangible and non-transitory machine-readable storage medium of claim 10, wherein said selected OCS host is not defined and said Destination-Host field of said Sy message is null.

12. The tangible and non-transitory machine-readable storage medium of claim 10, wherein said Sy message comprises a Spending-Limit-Request (SLR) command.

13. The tangible and non-transitory machine-readable storage medium of claim 9, wherein said instructions for selecting an OCS realm for said subscriber session further comprise:
   determining if said OCS realm is configured by policy rules and if so selecting said OCS realm configured by said policy rules;
   if said OCS realm is not configured by policy rules then determining if said OCS realm is configured by a subscriber attribute and if so selecting said OCS realm configured by said subscriber attribute; and
   if said OCS realm is not configured by a subscriber attribute then selecting the OCS realm configured by a system preference.

14. The tangible and non-transitory machine-readable storage medium of claim 9, wherein said instructions for selecting an OCS host for said subscriber session further comprise:
   determining if said OCS host is configured by policy rules and if so selecting said OCS host configured by said policy rules;
   if said OCS host is not configured by policy rules then determining if said OCS host is configured by a subscriber attribute and if so selecting said OCS host configured by said subscriber attribute;
   if said OCS host is not configured by a subscriber attribute then determining if said OCS host is configured by a system preference and if so selecting said OCS host configured by said system preference; and if said OCS host is not configured by a system preference then selecting the OCS host as null.

15. The tangible and non-transitory machine-readable storage medium of claim 9, wherein said policy rules, subscriber attribute and system preference are configured via a user interface.

16. The tangible and non-transitory machine-readable storage medium of claim 9, wherein said policy rules, subscriber attribute and system preference are configured via an application program interface (API).

17. The tangible and non-transitory machine-readable storage medium of claim 9, wherein said policy rules, subscriber attribute and system preference are configured at said PCRF node.

18. A Policy and Charging Rules Function (PCRF) node for a 3GPP-compliant packet data network, the PCRF node configured to:

receive at said PCRF node, a session establishment request for a subscriber (subscriber session);

select an OCS realm for said subscriber session based on, in order of priority, policy rules, subscriber attribute or system preference;

select an OCS host for said subscriber session based on, in order of priority, policy rules, subscriber attribute or system preference; and create an Sy session using the selected OCS realm and selected OCS host.

19. The PCRF node of claim 18, wherein creating said Sy session comprises sending a Sy message wherein the Destination-Realm field of said Sy message comprises said selected OCS realm and the Destination-Host field of said Sy message comprises said selected OCS host.

20. The PCRF node of claim 18, wherein said selecting an OCS realm for said subscriber session comprises:

determining if said OCS realm is configured by policy rules and if so selecting said OCS realm configured by said policy rules;

if said OCS realm is not configured by policy rules then determining if said OCS realm is configured by a subscriber attribute and if so selecting said OCS realm configured by said subscriber attribute;

if said OCS realm is not configured by a subscriber attribute then selecting the OCS realm configured by a system preference; and wherein said selecting an OCS host for said subscriber session comprises: determining if said OCS host is configured by policy rules and if so selecting said OCS host configured by said policy rules;

if said OCS host is not configured by policy rules then determining if said OCS host is configured by a subscriber attribute and if so selecting said OCS host configured by said subscriber attribute;

if said OCS host is not configured by a subscriber attribute then determining if said OCS host is configured by a system preference and if so selecting said OCS host configured by said system preference; and if said OCS host is not configured by a system preference then selecting the OCS host as null.

* * * * *